US006816645B2

(12) United States Patent
Tai

(10) Patent No.: US 6,816,645 B2
(45) Date of Patent: Nov. 9, 2004

(54) HIGH REFLECTION ISOLATION DEVICE

(75) Inventor: Shu-Lin Tai, San Jose, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 224 days.

(21) Appl. No.: 10/163,830

(22) Filed: Jun. 5, 2002

(65) Prior Publication Data

US 2003/0228101 A1 Dec. 11, 2003

(51) Int. Cl.[7] .............................................. G02B 6/32
(52) U.S. Cl. ...................................................... 385/34
(58) Field of Search ........................... 385/52, 24, 33, 385/34, 47, 48; 398/88

(56) References Cited

U.S. PATENT DOCUMENTS

| 6,347,170 | B1 | * | 2/2002 | Zheng .......................... 385/34 |
| 6,498,876 | B1 | * | 12/2002 | Liu et al. ....................... 385/34 |
| 2002/0118920 | A1 | * | 8/2002 | Francis et al. ................. 385/33 |
| 2003/0072527 | A1 | * | 4/2003 | Li et al. ........................ 385/34 |
| 2003/0103725 | A1 | * | 6/2003 | Li ................................ 385/34 |
| 2003/0185513 | A1 | * | 10/2003 | Hellman et al. ............... 385/47 |

* cited by examiner

Primary Examiner—Thien M. Le
Assistant Examiner—April Taylor
(74) Attorney, Agent, or Firm—Wei Te Chung

(57) ABSTRACT

A high reflection isolation device includes a metal tube (1), a glass tube (2) enclosed by the metal tube, a dual fiber pigtail (DFP) (3) having a first fiber (30) and a second fiber (32), a GRIN lens (4) engaging with the metal tube via an adhesive (7), a first filter (5) mounted on the GRIN lens, and a second filter (6) mounted between the dual fiber pigtail and the GRIN lens. Light input from the first fiber passes through the GRIN lens and encounters the first filter. The first filter passes only a first wavelength of light and reflects all others, which pass back through the GRIN lens to the second filter. The second filter passes only a second wavelength of light, which is transmitted into the second fiber.

8 Claims, 2 Drawing Sheets

HIGH REFLECTION ISOLATION DEVICE

BACKGROUND OF THE INVENTION

1. Field of the Invention

The present invention relates to bi-directional fiber optic communication systems and, more particularly, to a high reflection isolation device usable with such fiber optic systems.

2. Description of Related Art

Communication service providers are experiencing significant consumer demand to accommodate additional bandwidth in optically-based communication systems, and the demand is ever-increasing. In the future, all indications are that the use of fiber optic networks will become even more prevalent as a preferred medium for transferring information as the marketplace for wide-band services matures. It is anticipated that additional services such as enhanced pay-per-view, video-on-demand, interactive television and gaming, image networking, video telephony and CATV will be depend on and be substantial users of such systems.

Because capacity is a critical parameter for system viability, bi-directional systems are desirable when the increased capacity or other attributes afforded by a dual fiber pigtail (DFP) are required. Enabling bi-directional use of installed and developing fibers in fiber optic systems will permit communication service providers to gain additional utility from limited system resources.

Lasers are employed in numerous applications, particularly within fiber optic communication networks, in which a laser emits an information-carrying light signal to an optical fiber which transmits the light signal to a device for further processing. Typically, the optical signal propagates in one direction over a single optical fiber.

In the wavelength-division multiplexing (WDM) field, a filter is adapted to filter unwanted components of an incoming light signal. Assume, for example, that an incoming light signal contains two wavelengths, $\lambda_1$ and $\lambda_2$, and is carried by a first fiber of a DFP. A filter which only allows signals with wavelength $\lambda_1$ to pass will block signals with wavelength $\lambda_2$, so the transmission obtains good isolation. The reflected light signal is received by a second fiber of the DFP. The second fiber will pass $\lambda_2$ to another device for processing, along with any miscellaneous components of the reflected light besides $\lambda_2$. Unfortunately, the reflected signal has poor isolation, resulting in increased complexity and difficulty when processing the reflected light signal.

SUMMARY OF THE INVENTION

An object of the present invention is to provide a device to achieve high reflection isolation in a bi-directional fiber optic communication system.

A high reflection isolation device according to the present invention, includes a metal tube, a glass tube enclosed by the metal tub; a dual fiber pigtail (DFP) having a first fiber and a second fiber, a GRIN (graded index) lens engaging with the metal tube by an adhesive, a first filter mounted on a front end of the GRIN lens, and a second filter mounted between the dual fiber pigtail and the GRIN lens.

Further objects and advantages of the present invention will become more apparent from a consideration of the drawings and the following detailed description.

DETAILED DESCRIPTION OF THE PREFERRED EMBODIMENT

Figure 1:
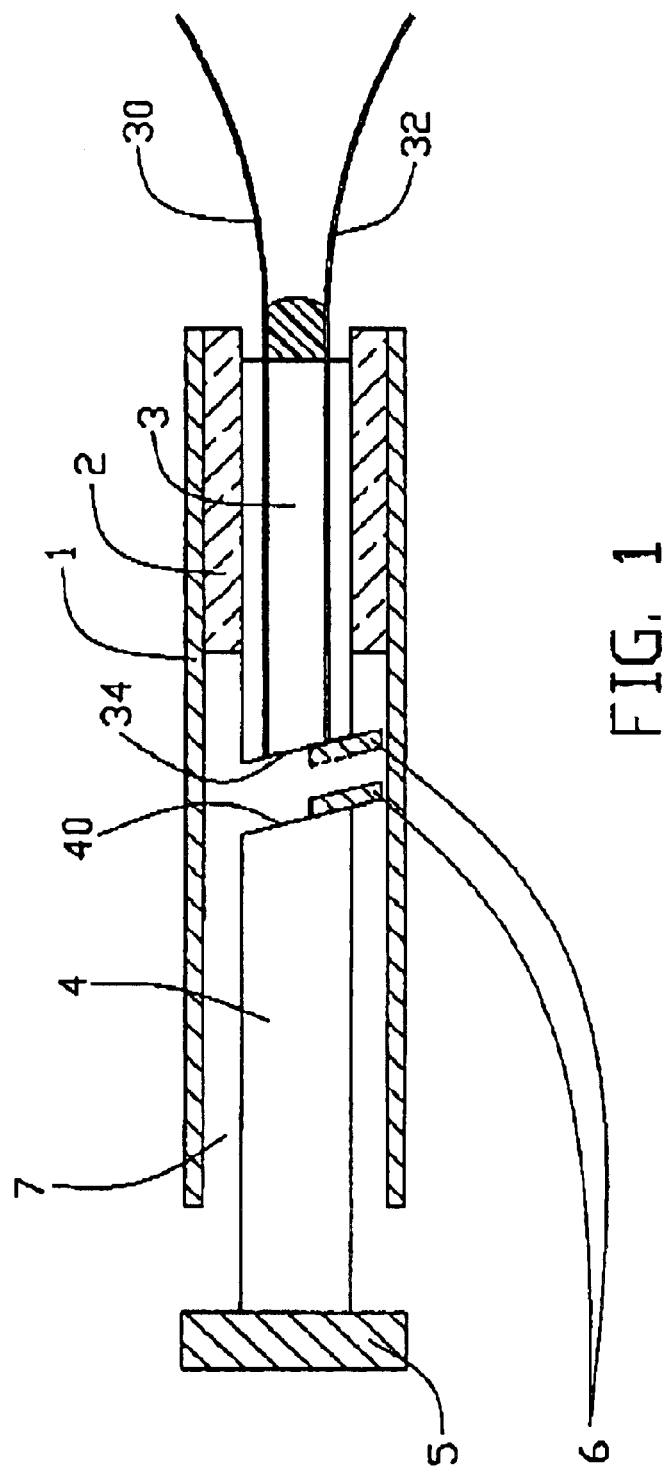
FIG. 1 is a partially cross-sectional view of a high reflection isolation device in accordance with the present invention.

Referring to FIG. 1, a high reflection isolation device comprises a metal tube 1 and a glass tube 2 enclosed by the metal tube 1. The metal tube 1 and the glass tube 2 together define a receiving space (not labeled) therein. A dual fiber pigtail (DFP) (or ferrule) 3 terminating a first fiber 30 and a second fiber 32 has an end face 34, and is received in the receiving space and fixed within the glass tube 2. A GRIN lens 4 is also arranged in the receiving space and fixed in the metal tube 1 by an adhesive 7. A front face (not labeled) of the GRIN lens 4 extends to an outside of the receiving space. The high reflection isolation device further comprises a first filter 5 mounted on the front face of the GRIN lens 4, and a second filter 6 mounted on a rear face 40 of the GRIN lens 4. Alternatively, the second filter 6 may be mounted on the end face 34 of the DFP 3, as shown in phantom in FIG. 1. The second filter 6 is aligned with the second fiber 32 but not with the first fiber 30. The GRIN lens 4 aligns with the DFP 3, and the rear face 40 of the GRIN lens 4 is spaced a fixed distance from the end face 34 of the DFP 3. As known, the high reflection isolation device shown in FIG. 1 may be deemed as a collimator, which may cooperate with another collimator shown in FIG. 2 to form a high reflection isolation assembly having three ports.

Figure 2:
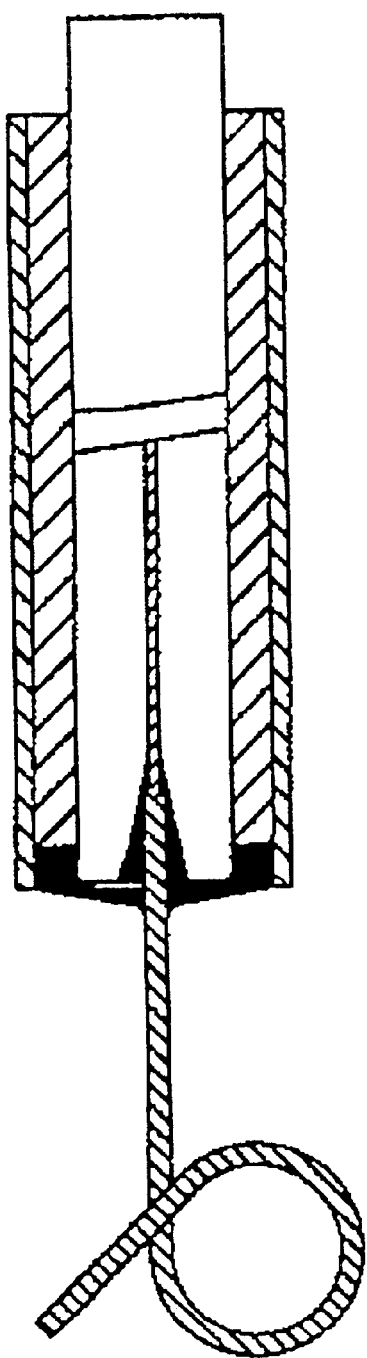
FIG. 2 is a counterpart of the high reflection isolation device of FIG. 1, for completing a whole optical assembly.

In operation, the incoming light signal includes two wavelengths $\lambda_1$, $\lambda_2$. The incoming light signal travels from the first fiber 30 through the GRIN lens 4, and then reaches the first filter 5. The first filter 5 is designed to just pass light with a wavelength of $\lambda_1$. Light of wavelength $\lambda_1$ goes through the first filter 5 to reach another device, for example, a single fiber colliniator (SFC) as shown in FIG. 2. The light signal reflected by the first filter 5 then goes back through the GRIN lens 4 and reaches the second filter 6. The second filter 6 is designed to just pass light with a wavelength of $\lambda_2$. Light of wavelength $\lambda_2$ goes through the second filter 6 and travels along the second fiber 32 to another device for further processing.

In comparison with the prior art, the device of the present invention provides the second filter 6 for improving isolation of the reflected signal of interest, $\lambda_2$. The component reflected by the first filter 5 contains miscellaneous wavelengths besides $\lambda_2$. Using the second filter 6, these miscellaneous wavelengths are blocked, so the reflected light signal carried by the second fiber 32 only has one wavelength, $\lambda_2$. Thus, one feature of the invention is to split two signals with respective two wavelengths $\lambda_1$, $\lambda_2$ in a single collimator with high isolation thereof, while achieving both compactness and low cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A high reflection isolation device comprising:

a metal tube;

a glass tube enclosed by the metal tube;

a dual fiber pigtail which has a first fiber and a second fiber, the dual fiber pigtail engaging with the glass tube;

a GRIN lens being attached within the metal tube and including a front face, the GRIN lens aligning with the dual fiber pigtail;

a first filter mounted on the front face of the GRIN lens; and a second filter mounted between the GRIN lens and the dual fiber pigtail, the second filter aligning with the second fiber and not the first fiber.

2. The device as claimed in claim 1, wherein the GRIN lens further includes a rear face on which the second filter is mounted.

3. The device as claimed in claim 1, wherein the dual fiber pigtail further includes an end face on which the second filter is mounted.

4. The device as claimed in claim 1, wherein the GRIN lens engages with the metal tube via an adhesive.

5. A high reflection isolation device comprising:

a metal tube;

a glass tube enclosed by the metal tube;

a dual fiber pigtail having a first fiber and a second fiber, the dual fiber pigtail being enclosed by the glass tube;

a GRIN lens attached to the metal tube and aligning with the dual fiber pigtail; and filter means for filtering unnecessary components respectively contained in an input light signal and a reflected light signal, and allowing light having a specific wavelength to pass through, the filter means comprising a filter aligning with the second fiber and not the first fiber; wherein the input light signal and the reflected light signal are transmitted via the first fiber and the second fiber, respectively.

6. A high reflection isolation device assembly comprising:

a ferrule with first and second fibers therein;

a GRIN lens axially aligned with and spaced from the ferrule;

a first filter for a first wavelength disposed on a distal end of said GRIN lens away from said ferrule; and a second filter for a second wavelength disposed between said GRIN lens and said ferrule; wherein said second filter does not block a light path coming from the first fiber, while said second filter essentially blocks another light path which is reflected from said first filter and is ready to enter the second fiber.

7. The assembly as claimed in claim 6, further including a counterpart ferrule with a third fiber therein, wherein a signal of the first wavelength leaves from the third fiber and a signal of the second wavelength leaves from the second fiber.

8. The assembly as claimed in claim 6, wherein said second filter is attached to one of opposing surfaces of said ferrule and said GRIN lens.

* * * * *